(12) United States Patent
Purvis et al.

(10) Patent No.: US 6,180,246 B1
(45) Date of Patent: Jan. 30, 2001

(54) PLASTICIZED POLYVINYL CHLORIDE AND INTERLAYER THEREOF

(75) Inventors: Michael B. Purvis, Perrysburg; Anthony A. Parker, Toledo, both of OH (US); Paul A. Holmes, Northwich; Julia B. MacLachlan, Adlington, both of (GB); John R. Scott, Lynnwood; Yasuo Negishi, Everett, both of WA (US)

(73) Assignee: Libbey-Owens-Ford Co., Toledo, OH (US)

(*) Notice: Under 35 U.S.C. 154(b), the term of this patent shall be extended for 0 days.

(21) Appl. No.: 08/182,757

(22) Filed: Jan. 18, 1994

(51) Int. Cl.$^7$ ................. B32B 17/10; B32B 27/30
(52) U.S. Cl. ............. 428/429; 428/103; 428/201; 428/210; 428/212; 428/442; 428/520
(58) Field of Search .................. 428/103, 201, 428/210, 212, 428, 429, 441, 442, 520; 524/436

(56) References Cited

U.S. PATENT DOCUMENTS

| | | | |
|---|---|---|---|
| 2,144,067 | 1/1939 | Kranzlein | 49/81 |
| 3,318,757 | 5/1967 | Atwell | 428/251 |
| 3,734,763 | 5/1973 | Plueddemann | 428/268 |
| 3,955,036 | 5/1976 | Plueddemann | 428/429 |
| 3,998,985 | 12/1976 | Kitaj | 427/386 |
| 4,027,072 | 5/1977 | Molari, Jr. | 428/212 |
| 4,218,513 * | 8/1980 | Williams et al. | 428/419 |
| 4,228,061 | 10/1980 | Plueddemann | 260/31.2 R |
| 4,277,538 | 7/1981 | Beckmann et al. | 428/429 |
| 4,358,329 | 11/1982 | Masuda | 156/106 |
| 4,362,587 | 12/1982 | Baudin et al. | 156/87 |
| 4,382,996 | 5/1983 | Mori et al. | 428/442 |
| 4,397,976 | 8/1983 | Mori et al. | 524/178 |
| 4,513,061 * | 4/1985 | Kawakubo et al. | 428/429 |
| 4,600,627 | 7/1986 | Honda et al. | 428/203 |
| 4,751,261 * | 6/1988 | Miyata et al. | 524/181 |
| 4,861,816 * | 8/1989 | Kobayashi et al. | 524/204 |
| 4,911,984 | 3/1990 | Parker | 428/428 |
| 5,004,776 * | 4/1991 | Tadenuma et al. | 524/377 |
| 5,013,779 | 5/1991 | Fariss et al. | 524/314 |

FOREIGN PATENT DOCUMENTS

| | | |
|---|---|---|
| 0569299 | 11/1993 | (EP). |
| 1485517 | 9/1977 | (GB). |
| 2-225348 | 9/1990 | (JP). |

OTHER PUBLICATIONS

Plasticizers, Chemicals and Additives, Modern Plastics Mid–Oct. Issue 1990 (pp. 200 and 668).*
Booklet entitled "Processing For Adhesives Bonded Structures", No. 19, Interscience Publishers, Edwin P. Plueddemann, 1972, pp. 75–90.
Booklet entitled "Organofunctional Silanes", Union Carbide, 1991, pp. 1–60.

* cited by examiner

Primary Examiner—D. S. Nakarani
(74) Attorney, Agent, or Firm—Marshall & Melhorn

(57) ABSTRACT

An improved plasticized polyvinyl chloride interlayer for laminated safety glass, and an improved method of manufacturing a laminated safety glass including such plasticized polyvinyl chloride containing film is disclosed. An improved functional silane adhesion promoter is utilized in such a manner so as to impact energy dissipation is maximized while structural integrity is maintained. The plasticized polyvinyl chloride interlayer is formulated so as to provide improved long term heat stability at service use temperatures.

4 Claims, No Drawings

PLASTICIZED POLYVINYL CHLORIDE AND INTERLAYER THEREOF

BACKGROUND OF THE INVENTION

1. Field of the Invention

The present invention relates to compositions and interlayers for laminated glazings and, more particularly, to plasticized polyvinyl chloride resin forming such interlayers.

2. Summary of Related Art

Safety glass is a well known term for a glass sandwich composed of an interlayer bonding together two glass plates or sheets so that breaking the glass results in minimum dispersion of broken glass fragments. The interlayer must possess a number of properties, including the following: high impact energy adsorption to minimize concussive injury; shear and tear strength sufficient to prevent rupture of the interlayer by the broken glass; sufficient adhesion to the glass to inhibit laceration on contact with, and prevent dispersion of, broken glass; acceptable thermal heat stability and weatherability; and good optical quality. The interlayer must possess these properties over the wide range of temperatures in which these laminated glazings are used.

It has been widely known to use a film of plasticized polyvinyl butyral as the interlayer material in safety glass for automobiles, air planes and building materials because of its high adhesiveness and superior light stability, transparency and low-temperature flexibility. However, the use of plasticized polyvinyl butyral films makes the production of laminated safety glass relatively expensive.

The surface of plasticized polyvinyl butyral film is very tacky, and presents a problem of blocking at the time of windup after film formation. Thus, plasticized polyvinyl butyral film must be provided with some parting means if it is to be stored or transported in the form of stacks of die-cut blanks or in the form of rolls. Furthermore, the production of plasticized polyvinyl butyral films requires specialized equipment and, due to their sensitivity to moisture, plasticized polyvinyl butyral films must generally be handled under controlled atmosphere conditions during manufacture, storage and immediately prior to their incorporation into the laminated safety glass. This all adds to the expense of utilizing plasticized polyvinyl butyral films in laminated safety glass.

Alternative interlayer materials have been proposed. For instance, U.S. Pat. No. 4,277,538 to Beckmann et al discloses a laminated safety glass employing a sheet of plasticized polyvinyl chloride (PVC) as the interlayer. The use of PVC would be advantageous in that it may be produced on conventional equipment and would be much less expensive to manufacture and process into a laminated safety glass when compared with polyvinyl butyral. However, by itself, a PVC film will not adhere to glass. To increase the adhesion of the PVC to glass, Beckmann et al suggest the use of an organofunctional silane, either as a primer or uniformly dispersed within the PVC film.

At least certain of the silicon-organofunctional silanes proposed by Beckmann et al are effective to increase the adhesion of a PVC interlayer to the glass sheets of a laminated safety glass. However, the laminated safety glass employing a PVC interlayer as taught by Beckmann et al does not possess all of the properties required of an interlayer for laminated safety glass, and therefore has not been placed into general use. For instance, the Beckmann et al interlayer has poor long term heat stability at service use temperatures. In addition, Beckmann et al were primarily concerned with increasing adhesion, not with improving impact resistance. It was found that the Beckmann et al laminated safety glass exhibits low energy adsorption characteristics. To compensate, a relatively thick PVC interlayer is required.

SUMMARY OF THE INVENTION

The present invention relates to an improved plasticized polyvinyl chloride interlayer for laminated safety glass, and an improved method of manufacturing a laminated safety glass wherein a pair of glass sheets are bonded to opposed sides of a plasticized polyvinyl chloride containing film at elevated temperature. In accordance with one aspect of the invention, the PVC film includes a plasticizer comprising a linear or branched aliphatic diester, triester or tetraester, or aromatic diester, triester or tetraester, or mixtures thereof, the concentration of said plasticizer being between about 40 to about 70 parts per hundred parts of resin (phr).

In another aspect of the invention, an interlayer is formed of a plasticized polyvinyl chloride containing film including about 1 to 5, preferably 2 to 4 phr of a primary heat stabilizer including an organometallic compound, such as salts of the alkaline metals and selected transition metals. The primary heat stabilizer preferably includes from about 1.6 to 4.0% atomic zinc as a zinc salt of an organic acid, and from about 7.0 to 14.0% atomic barium as a barium salt of an organic acid.

The plasticized polyvinyl chloride containing film preferably includes about 1 to 5, preferably 2 to 4 phr of primary heat stabilizer comprising organometallic compound and a phosphite, and secondary heat stabilizers including epoxidized oils, perchlorates, and 1,3 [beta]-diketones.

An improved safety glass also results from providing a plasticized PVC containing interlayer bonded to a pair of silicate glass sheets with an adhesion promoter comprising a mercapto-functional silane.

In a still further aspect of the present invention, wherein a pair of glass sheets are bonded to opposed sides of a plasticized polyvinyl chloride containing film at elevated temperature with an adhesion promoter comprising a functional silane, an improvement results wherein the functional silane is applied to only a portion of the plasticized PVC containing film or to only a portion of the glass sheets to achieve a controlled level of adhesion between the plasticized PVC containing film and the glass sheets.

In another aspect of the invention, an improved safety glass results where more of the functional silane is applied around the periphery of the plasticized polyvinyl chloride containing film than is applied near the center thereof, to achieve a higher level of adhesion between the plasticized polyvinyl chloride containing film and the glass sheets around the periphery thereof.

It has also been found that to obtain adequate adhesion between the plasticized PVC containing film and the glass, the PVC film must be treated so as to increase the level of unsaturation in the film.

In an additional aspect of the invention, an improved vehicle safety glass results wherein the level of adhesion between the inboard glass sheet and the plasticized PVC containing film is greater than the level of adhesion between the outboard glass sheet and the plasticized PVC containing film.

Moreover, an improved safety glass results where the plasticized PVC containing film is comprised of at least two distinct polyvinyl chloride containing layers having different levels of plasticization.

Further, an improved safety glass results where a material which absorbs ultraviolet radiation is applied to the surface of the plasticized PVC containing film or to the surface of the outer glass sheet.

An object of the present invention, therefore, is to provide an improved PVC interlayer for laminated safety glass;

A further object is to provide a controlled level of adhesion between the PVC interlayer and the two glass sheets, so that impact energy dissipation is maximized while structural integrity is maintained;

Another object of the invention is to provide such a laminated safety glass utilizing an improved functional silane adhesion promoter;

Another object of the invention is to provide such a laminated safety glass having a relatively thin interlayer of PVC;

A still further object is to provide such a laminated safety glass which possesses improved long term heat stability at service use temperatures;

Other objects and advantages will become more apparent during the course of the following description.

DESCRIPTION OF THE PREFERRED EMBODIMENT

The numerous and varied properties required of an interlayer material for use in laminated safety glass has made it very difficult to successfully develop such laminated safety glass employing a PVC interlayer, even though the cost advantages of so doing are potentially substantial. As mentioned above, the properties an interlayer must possess include: high impact energy adsorption; shear and tear strength sufficient to prevent rupture of the interlayer by broken glass; sufficient adhesion to the glass to inhibit laceration on contact with, and prevent dispersion of, broken glass; acceptable thermal heat stability and weatherability; and good optical quality. Laminated safety glass employing a plasticized PVC containing film and adhesion promoter has now been developed which exhibits all of these properties and is less expensive to produce than a comparable laminated safety glass employing polyvinyl butyral.

In accordance with the present invention, the interlayer is formed of a high number average molecular weight vinyl chloride homopolymer, copolymer or graft polymer, or combinations thereof. Preferably, the interlayer is formed of polyvinyl chloride homopolymer having a number average molecular weight, or a mixture of number average molecular weights, of at least 30,000. In a preferred embodiment, the number average molecular weight, or mixture of number average molecular weights, is between about 40,000 and about 165,000, with a degree of polymerization of about 500 to 2600. One preferred PVC resin is SE-1300, having a degree of polymerization of 1300 and a number average molecular weight of 80,600, which is commercially available from Shintech Inc. of Houston, Tex. Control of the molecular weight distribution and purity of the PVC has been found to be very important in a safety glass interlayer application. Variances in molecular weight distribution can have a profound effect on the impact properties and processability of the film. In addition, the presence of impurities, such as initiators, can lead to excessive degradation and yellowing of the interlayer and can have a detrimental effect on the long term heat stability of the interlayer. Accordingly, the PVC is preferably formed by suspension polymerization, which offers superior control of molecular weight and the removal of impurities.

It has also been found that a plasticized film containing a blend of a PVC homopolymer with a copolymer of vinyl chloride and vinyl acetate provides an improved interlayer. Such a copolymer exhibited improved flow properties, and hence improved processability, over the PVC homopolymer. The interlayer is formed of a copolymer of from about 75 to 98 phr PVC and from about 2 to 25 phr polyvinyl acetate. In a preferred embodiment, the blend is about 95 phr PVC homopolymer and about 5 phr of a vinyl chloride/vinyl acetate copolymer. Examples of suitable vinyl chloride/vinyl acetate copolymers are MPR-TSN, commercially available from Nissin Chemicals, Nitta-Gun, Japan, which is a copolymer of 87% vinyl chloride and 13% vinyl acetate with a degree of polymerization of 400; and UCAR UYHD, commercially available from OSi Specialties, Inc., South Charleston, W.Va., which is a copolymer of 86% vinyl chloride and 14% vinyl acetate with a degree of polymerization of 220.

The plasticizers for the preparation of the plasticized films containing PVC in accordance with the invention can be linear or branched aliphatic diesters, triesters or tetraesters, or aromatic diesters, triesters or tetraesters, or mixtures thereof. From a performance standpoint, preferred plasticizers include dihexyl azelate (DHZ), dihexyl adipate (DHA) and dioctyl azelate (DOZ). However, dioctyl adipate (DOA), while providing slightly reduced performance relative to the other noted plasticizers, may be most preferred in view of its combination of performance and relatively lower cost.

Where the interlayer is comprised of substantially homogenous layer of PVC containing film, the plasticizer concentration is between about 40 to about 70 phr, depending primarily upon the number average molecular weight and molecular weight distribution of the PVC containing resin. A plasticizer concentration of between about 50 and about 60 phr is most preferred. Where the interlayer is comprised of multiple layers with non-homogeneous plasticizer concentrations (as discussed in more detail below), the plasticizer concentration can range from about 20 to 85 phr.

To form acceptable laminated safety glazings from the plasticized PVC containing films, heat stabilizers are required to provide both high temperature heat stability as well as long term, service use temperature heat stability. In fact, it has been theorized that a certain level of degradation, resulting in an increased level of unsaturation, of the PVC film is necessary to obtain proper adhesion. Accordingly, the heat stabilizers for the PVC film of the present invention are optimized for such service use temperature heat stability; that is, for temperatures up to about 65° C., but typically over the range of about −40° to 70° C.

The PVC containing film is provided with between about 1 to 5, preferably 2 to 4 phr of a primary heat stabilizer including an organometallic compound, such as salts of the alkaline metals and selected transition metals, including aluminum, barium, cadmium, calcium, lead, magnesium, tin, and zinc. Zinc salts of organic acids provide the best low temperature heat stability for the PVC containing film. However, a resulting byproduct is $ZnCl_2$ enhances degradation in the PVC containing film, and may lead to catastrophic failure of the interlayer formed therewith. The addition of a chelating agent, such as a [beta]-diketone, a phosphite, or both, reduces the chance of catastrophic failure. In addition, it has been found that a barium salt of an organic acid mixed with the zinc salt of an organic acid reduces the chance of, or at least delays, catastrophic failure.

The primary heat stabilizer preferably includes a mixture of a zinc salt of an organic acid and a barium, calcium or tin salt of an organic acid, or a mixture thereof. The primary heat stabilizer preferably includes from about 1.6 to 4.0% atomic zinc as a zinc salt of an organic acid, and from about 7.0 to 14.0% atomic barium as a barium salt of an organic acid. The zinc salt may be, for example, zinc stearate, zinc laurate, zinc oleate, zinc iso-stearate, zinc octoate, or zinc decanate, or mixtures thereof. Likewise, examples of suitable barium and calcium salts include barium or calcium stearate, laurate, oleate, iso-stearate, octoate, or decanate, nonylphenolate, or mixtures thereof.

To maximize the long term, service use temperature heat stability of a PVC film used as a safety glass interlayer, the primary heat stabilizer also preferably includes from about 2.0 to 4.0% phosphorus as phosphites. A preferred phosphite has been found to be triphenyl phosphite.

In addition to the primary heat stabilizer, the PVC containing film also preferably includes several secondary heat stabilizers, including epoxidized oils, perchlorates, and 1,3 [beta]-diketones. From about 2.5 to 15.0 phr of an epoxidized oil is preferably included as a secondary heat stabilizer in the PVC containing film. A preferred epoxidized oil is epoxidized soybean oil. The PVC film also preferably includes from about 0.1 to 1.0 phr of a perchlorate, a preferred perchlorate being sodium perchlorate. As another secondary heat stabilizer, the PVC film is provided with between about 0.1 and 2.0 phr of a 1,3 [beta]-diketone. A preferred 1,3 [beta]-diketone has been found to be stearyl benzoyl methane.

The PVC containing film formulation may also include other additives, such as UV light stabilizers, antioxidants, optical brighteners, dyes and the like. Thus, the safety glass interlayer of the invention is preferably formed from a formulation including from about 0 to 2 phr of a benzophenone or benzotriazole derivative as a UV stabilizer, from about 0 to 5 phr hindered phenols as an antioxidant, from about 0 to 1 phr of a fluorescent or whitening agent, and from about 0 to 1 phr of a blue dye. In a most preferred embodiment, UV light stabilizer is applied to the outer glass sheet and/or the surface of the PVC containing interlayer adjacent the outer glass sheet by a suitable application method, such as spraying. The UV light stabilizer is most preferably mixed with the functional silane adhesion promoter and then applied to the outer glass sheet/interlayer interface. Concentration of the UV light stabilizer at the surface of the interlayer has been found to reduce degradation of the PVC containing film.

As noted above, a PVC film will not adhere to glass by itself; some means of adhesion promotion is required to obtain a suitable safety glass wherein the interlayer has sufficient adhesion to the glass to inhibit laceration on contact with, and prevent dispersion of, broken glass. On the other hand, full adhesion, which can be achieved by normal application of some silane materials, is generally not ideal because it virtually eliminates the energy dissipation which would otherwise result from the separation of the interlayer-glass interface, resulting in a safety glass having relatively low energy adsorption characteristics. Some other means, such as a thicker interlayer, would then be required to provide adequate energy adsorption characteristics. Thus, in a safety glass application, a controlled, intermediate level of adhesion between the PVC interlayer and the glass is generally preferred.

Organofunctional silanes have been known to enhance the adhesion between organic polymers and inorganic substrates, due to the combination of organic activity and silicon reactivity of such compounds. Organofunctional silanes suitable for use as an adhesion promoter in accordance with the present invention include aminofunctional silanes, especially N-[beta-(N'-paravinylbenzyl)-aminoethyl]-gamma-aminopropyltrimethoxy-silane hydrochloride (commercially available as Z6032 from Dow Corning). To obtain acceptable adhesion, prehydrolysis of the silane to a low molecular weight monomer or oligomer is required. The organofunctional silane adhesion promoter may be applied to the glass/interlayer interface, or may be incorporated into the formulation which is formed into the interlayer.

While the aminofunctional silanes provide acceptable adhesion between the PVC containing film and the glass sheets, autoclave temperatures and pressures must typically be higher than those required for the lamination of safety glass employing a polyvinyl butyral interlayer. It is has been found, however, that by using a mercapto-functional silane as the adhesion promoter, normal autoclave temperatures and pressures are sufficient to achieve the desired levels of adhesion. A most preferred adhesion promoter is gamma mercapto propyl triethoxy silane.

In addition, it has been determined that the plasticized PVC containing film must be functionalized somewhat in order to obtain sufficient adhesion of the PVC film to the glass sheets with a functional silane adhesion promoter. While not intending to be bound by any particular theory, it is believed that the bonding sites created, such as diene or carbonyal structures, as examples, are essential for the bonding of the PVC backbone to the silane adhesion promoter. As the density of bonding sites is proportionate to the degree of yellowing, observation of the yellowing index is a useful means by which to measure the density of the bonding sites. The PVC film should be treated so as to produce a change in yellowing index of the film of between about 0.5 to 16% YI, and preferably from about 0.5 to 1% YI. The density of the bonding sites can be controlled in any suitable manner, such as through adjustment of autoclave temperatures and times and by modification of the heat stabilizers added to the PVC, as examples. Furthermore, the PVC film can be sufficiently altered before, during or after lamination.

The application of some functional silane adhesion promoters may in fact provide a level of adhesion between the PVC film and the glass which is disadvantageously high. As noted above, a controlled intermediate level of adhesion between the PVC interlayer and the glass is generally preferred to maximize the energy dissipation characteristics and structural integrity of the safety glass with the thinnest possible interlayer. A preferred method of achieving such a controlled level of adhesion is to apply the adhesion promoter to only a portion of either the PVC film or the glass sheets, while the remaining portions of the PVC film or glass sheets are devoid of any adhesion promoter and the glass sheets and PVC contact each other directly in such areas.

The adhesion promoter may be applied to only certain portions of the PVC film or glass sheets in any suitable manner. A preferred method is to apply the adhesion promoter by means of a silk screening process to the PVC film or glass sheets in any desired pattern.

An additional advantage of this method is that the adhesion promoter can be selectively applied to obtain varying levels of adhesion at different locations on the safety glass. Thus, the adhesion promoter can be applied around the periphery of the PVC film in a more dense pattern than that applied near the center of the safety glass, to achieve a higher level of adhesion between the PVC film and glass sheets around the periphery thereof. This is advantageous in that it allows the majority of the safety glass to exhibit a controlled, intermediate level of adhesion, while maintaining a relatively high level of adhesion around the periphery of the safety glass to prevent the introduction of atmosphere gases and moisture between the glass sheets which may excessively degrade the PVC interlayer.

It has also been determined that improvements in adhesion result when the surfaces of the PVC film are treated to increase the surface energy thereof, preferably to at least 35 ergs/cm$^2$. This is especially so where the PVC film includes organometallic compounds, such as are included in the primary heat stabilizer discussed above. It is believed that such organometallic compounds occasionally plate out on the surface of the PVC. While not intending to be bound by any particular theory, this plating out of the organometallics is believed to significantly inhibit the effectiveness of the functional silane in promoting adhesion between the PVC film and the glass sheets. A surface treatment which increases the surface energy of the film as noted above appears to remove the plated out organometallics and other impurities from the surface, so that the PVC film can effectively bond to the glass via the functional silane adhesion promoter.

This surface treatment may be accomplished by any suitable method, such as subjecting the PVC containing film to a corona discharge, flame ionization, or plasma treatments. A preferred method is subjecting the PVC film to a corona discharge treatment of at least about 20 watts/m$^2$/minute to restore the effectiveness of the functional silane adhesion promoter.

In another aspect of the invention, a vehicular windshield is formed wherein the level of adhesion between the inboard glass sheet and the PVC film is greater than the level of adhesion between the outboard glass sheet and the PVC film. The level of adhesion between the outboard glass sheet and the PVC film is relatively low to maximize the impact resistance of the windshield by allowing separation of the glass-interlayer interface resulting in a significant dissipation of the energy of impact. The level of adhesion between the inboard glass sheet and the PVC film, on the other hand, is relatively high to maximize the structural integrity of the windshield and prevent the dispersion of any glass which may be broken upon impact.

The level of adhesion between the inboard glass sheet and the PVC interlayer and between the outboard glass sheet and the PVC interlayer, respectively, can be controlled in any suitable manner. For instance, a more effective adhesion promoter can be applied between the inboard glass sheet and the PVC interlayer, while a relatively less effective adhesion promoter is applied between the outboard glass sheet and the PVC interlayer. As an additional example, the adhesion promoter can be applied to only certain portions of the glass sheets or PVC film, with a more dense application of adhesion promoter provided between the inboard glass sheet and the PVC interlayer than is provided between the outboard glass sheet and the PVC interlayer.

The safety glass interlayer may also advantageously be formed of a plurality of distinct, non-homogeneous polyvinyl chloride containing layers. The interlayer may be formed of distinct layers of PVC containing film having different levels of plasticization. Thus, the interlayer may be formed of two outer layers provided with about 50 to 85 phr of a plasticizer, and an intermediate layer provided with about 10 to 50 phr of a plasticizer. The relatively higher level of plasticization of the outer layers optimizes the flow properties, and hence the processability, of the interlayer as a whole. The relatively lower level of plasticization of the intermediate layer optimizes the overall impact properties of the interlayer.

In a similar fashion, the interlayer may be formed of distinct layers of PVC containing film having different number average molecular weights—the outer layers being formed of a lower number average molecular weight PVC in the range of 40,000 to 70,000, and the intermediate layer being formed of a higher number average molecular weight PVC in the range of 70,000 to 165,000. Again, the relatively lower number average molecular weight of the outer layers optimizes the flow properties, and hence the processability, of the interlayer as a whole; while the relatively high number average molecular weight of the intermediate layer optimizes the overall impact properties of the interlayer.

The following examples are illustrative of the present invention and do not constitute any limitation with regard to the subject matter of the invention.

All laminated samples were assembled as follows. Two clear glass plates (0.088" thick) were cleaned with an ammonia solution, the air side of each piece of glass was wiped with adhesion promoter, and a piece of PVC film was placed between the two primed glass surfaces. After assembly, two different procedures were used for de-airing the glass/plastic assemblies. Small samples, four and twelve inch square, were wrapped in crinkled cellophane and placed in a Mylar bag. The bag was evacuated for from 5 to 25 minutes and then sealed shut. Windshield samples were de-aired using vacuum rings. Typically, the small samples were processed in the same air autoclave cycle with the windshield samples. The small samples were used for adhesion, impact resistance, and heat stability, while the windshields were used for inspection of optical quality.

The adhesion, impact resistance, heat stability, and optical quality of each of the laminated safety glasses in these examples were measured by the following methods.

1. Adhesion

The pummel test was used to measure interlayer adhesion to the glass. Twelve inch square glass laminates were placed in a −18° C. refrigerator for at least two hours. After removal from the refrigerator, the laminates were placed on a metal substrate and hit repeatedly with a 16 oz. hammer to break the glass. All broken glass unadhered to the interlayer was then removed. The amount of glass left adhered to the interlayer was visually compared with a set of standards of known pummel scale and a pummel value for each sample was assigned, ranging from a pummel value of 0 (no adhesion; no glass adhered) to 10 (high adhesion, 100% of the glass adhered).

2. Impact Resistance

Impact resistance, expressed as the Mean Break Height (MBH), was measured by the ball drop method. For each determination of the MBH, 20 to 50 twelve inch square laminated samples were prepared and kept at between 70° F. and 85° F. for at least four hours immediately preceding the test. Each sample was then placed in a hardwood frame (as described in ANSI Z26.1 safety code) and a 5 lb. ball was dropped from a predetermined height onto the center of the sample. A sample which allowed the ball to pass through was judged to "Fail"; a sample which did not allow the ball to pass through was judged to "Support". The MBH then is determined to be the height at which 50% of the samples Failed. MBH was also measured at low temperature (−18° C.) and at high temperature (60° C.).

3. Heat Stability

Heat stability was determined by monitoring the yellowing rate of four inch square laminated samples in one or more temperature controlled ovens. After measuring the initial yellowness index (YIC) using the Spectrogard from Gardner/BYK of Silver Springs, Md., samples were placed in one of five ovens set at various temperatures (65, 80, 100, 120 and 150° C.). The samples were removed from the ovens at regular intervals and the YIC was measured. The various time intervals were as follows: 500 hours for the oven at 65° C., 250 hours for the oven at 80° C., 48 hours for the oven at 100° C., 24 hours for the oven at 120° C., and 4 hours for the oven at 150° C.

4. Optical Quality

The optical quality of laminated samples was determined by measurement of transmitted distortion using a float glass distortion meter, and by visual inspection using both a shadowgraph and a gridboard background. Transmitted haze was measured with a Hazegard XL200 from Gardner/BYK.

EXAMPLE 1

A film 0.045" thick was made having the following formulation:

| Component | phr |
| --- | --- |
| SE1300 PVC Resin[1] | 100 |
| DOA | 50 |
| Drapex 6.8[2] | 5 |
| UBZ 793[3] | 3 |
| CPL46[4] | 0.2 |
| Irganox 1010[5] | 1 |
| Tinuvin 328[6] | 0.2 |

[1]PVC resin having a degree of polymerization of 1300 available from Shintech Inc. of Freeport, TX.
[2]Epoxidized soybean oil available from Witco Corp. of Oakland, NJ.
[3]Barium/zinc stabilizer package available from Baerlocher USA of Dover, OH.
[4]Perchlorate stabilizer available from Asahi Denka Kogyo K.K. of Japan.
[5]Hindered phenolic antioxidant available from Ciba-Geigy Corp. of Hawthorne, NY.
[6]Benzatriazole ultraviolet light stabilizer available from Ciba-Geigy Corp.

A 7% solution of prehydrolyzed N-[beta-(N'-paravinylbenzyl)-aminoethyl]-gamma-aminopropyltrimethoxy-silane hydrochloride (commercially available as Z6032 from Dow Corning) in methanol was used as the adhesion promoter. The autoclave cycle consisted of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure. Clear glass was used.

Clear laminates were obtained with the following results:

| Property | Value |
| --- | --- |
| Adhesion (pummel) | 6 |
| Impact (MBH) at −18° C. | 12' |
| Impact (MBH) at 23° C. | 29' |
| Impact (MBH) at 60° C. | 14' |

-continued

| Property | Value |
| --- | --- |
| % Ta | 87.9 |
| % Haze | 0.7 |
| Initial YIC | −0.1 |
| Heat stability* | 12.2 |
| Optical quality | poor |

*YIC after 500 hours at 100° C.

EXAMPLE 2

A film 0.045" thick was made having the following formulation:

| Component | phr |
| --- | --- |
| 1300 PVC Resin | 100 |
| DOA | 52 |
| Drapex 6.8 | 5 |
| Thermchek 130[7] | 3 |
| CPL46 | 0.15 |
| Irganox 1010 | 1 |
| Tinuvin 328 | 0.2 |
| Rhodiastab 50[8] | 0.5 |
| Uvitex[9] | 0.01 |

[7]Barium/zinc stabilizer package available from Ferro Corp. of Walton Hills, OH.
[8]1,3-beta-diketone stabilizer available from Rhone-Poulenc Inc. of Monmouth Junction, NJ.
[9]Optical brightener available from Ciba-Geigy Corp.

The adhesion promoter was a 5% solution of prehydrolyzed Z6032 in methanol.

The autoclave cycle consisted of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure. Clear glass was used.

Clear laminates were obtained with the following results:

| Property | Value |
| --- | --- |
| Adhesion (pummel) | 8 |
| Impact (MBH) at −18° C. | 12' |
| Impact (MBH) at 23° C. | 18' |
| Impact (MBH) at 60° C. | 11' |
| % Ta | 88.4 |
| % Haze | 0.5 |
| Initial YIC | 0.6 |
| Heat stability* | 5.5 |
| Optical quality | poor |

*YIC after 500 hours at 100° C.

EXAMPLE 3

A film 0.045" thick was made having the following formulation:

| Component | phr |
| --- | --- |
| Shintech 1300 PVC Resin | 100 |
| DHZ | 55 |
| Drapex 6.8 | 3 |

-continued

| Component | phr |
|---|---|
| No. 5377[10] | 0.1 |
| Tinuvin 328 | 0.5 |
| L-1960[11] | 1.5 |
| KP-11[12] | 0.5 |

[10]Perchlorate stabilizer available from Akishima Chemical Corp. of Japan.
[11]Barium/zinc stabilizer package available from Synthetic Products Co. of Cleveland, OH.
[12]Barium/zinc stabilizer available from Asahi Denka Kogyo K.K. of Japan.

The adhesion promoter was a 4% solution of prehydrolyzed Z6032 in methanol. The film was subjected to a corona discharge treatment of about 20 to 40 watts/m$^2$/minute.

The autoclave cycle consisted of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure. An infrared and ultraviolet radiation absorbing green glass, sold commercially by Libbey-Owens-Ford Co. under the trademark EZ-KOOL, was used.

Laminates were obtained with the following results:

| Property | Value |
|---|---|
| Adhesion (pummel) | 2 |
| Impact (MBH) at −18° C. | 23' |
| Impact (MBH) at 23° C. | 24' |
| Impact (MBH) at 60° C. | 9' |
| % Ta | 70.1 |
| % Haze | 1 |
| Initial YIC | 1.3 |
| Heat stability* | 3.6 |
| Optical quality | poor |

*YIC after 500 hours at 100° C.

After 13,768 hours at 65° C., the YIC for example 3 was determined to be 3.0.

EXAMPLE 4

A film 0.045" thick was made having the following formulation:

| Component | phr |
|---|---|
| 1300 PVC Resin | 95 |
| MPR-TSN[13] | 5 |
| DOA | 50 |
| Drapex 6.8 | 5 |
| Thermchek 130 | 3 |
| Irganox 1010 | 1 |
| CPL-46 | 0.15 |
| Tinuvin 328 | 0.2 |

[13]MPR-TSN, commercially available from Nissin Chemicals, is a copolymer of 90% vinyl chloride and 10% vinyl acetate with a degree of polymerization of 400.

The adhesion promoter was a 4% solution of prehydrolyzed Z6032 in methanol.

The autoclave cycle consisted of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure. Clear glass was used.

Clear laminates were obtained with the following results:

| Property | Value |
|---|---|
| Adhesion (pummel) | 9 |
| Impact (MBH) at −18° C. | 13' |
| Impact (MBH) at 23° C. | 19' |
| Impact (MBH) at 60° C. | 12' |
| % Ta | 87.8 |
| % Haze | 0.8 |
| Initial YIC | 0.8 |
| Heat stability* | 11.5 |
| Optical quality | good |

*YIC after 500 hours at 100° C.

EXAMPLE 5

A film comprised of 3 separate layers, the outer layers each being 0.0065" thick and the inner layer being 0.033" thick, was made. The two outer layers had the following formulation:

| Component | phr |
|---|---|
| 1300 PVC Resin | 100 |
| DOA | 60 |
| Drapex 6.8 | 5 |
| Thermchek 130 | 3 |
| Irganox 1010 | 1 |
| CPL-46 | 0.2 |
| Tinuvin 328 | 0.2 |

The inner layer had the following formulation:

| Component | phr |
|---|---|
| 1300 PVC Resin | 100 |
| DOA | 50 |
| Drapex 6.8 | 5 |
| UBZ 793 | 3 |
| Irganox 1010 | 1 |
| CPL-46 | 0.2 |
| Tinuvin 328 | 0.2 |

The adhesion promoter was a 4% solution of prehydrolyzed gamma mercapto propyl triethoxy silane in isopropyl alcohol.

The autoclave cycle consisted of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure. Clear glass was used.

Clear laminates were obtained with the following results:

| Property | Value |
|---|---|
| Adhesion (pummel) | 7 |
| Impact (MBH) at −18° C. | 22' |
| Impact (MBH) at 23° C. | 25' |
| Impact (MBH) at 60° C. | 16' |
| % Ta | 88.3 |
| % Haze | 0.6 |
| Initial YIC | −0.2 |
| Heat stability* | 4 |
| Optical quality | poor |

*YIC after 500 hours at 100° C.

EXAMPLE 6

A film 0.045" thick was made having the following formulation:

| Component | phr |
|---|---|
| 1300 PVC Resin | 75 |
| 750 PVC Resin[14] | 25 |
| DOA | 60 |
| Drapex 6.8 | 5 |
| Thermchek 130 | 3 |
| Irganox 1010 | 1 |
| CPL-46 | 0.2 |
| Tinuvin 328 | 0.2 |
| Rhodiastab 50 | 0.25 |

[14]PVC resin having a degree of polymerization of 750 available from Shintech Inc.

14. PVC resin having a degree of polymerization of 750 available from Shintech Inc.

The adhesion promoter was a 4% solution of prehydrolyzed gamma mercapto propyl triethoxy silane in isopropyl alcohol.

The autoclave cycle consisted of: 1) a 10 minute temperature ramp to 340° F. and an 8 minute pressure ramp at 240 psi; 2) a 25 minute hold at 340° F. and 240 psi; and 3) a 10 minute ramp down to room temperature and pressure. Clear glass was used.

Clear laminates were obtained with the following results:

| Property | Value |
|---|---|
| Adhesion (pummel) | 9 |
| Impact (MBH) at −18° C. | — |
| Impact (MBH) at 23° C. | 13' |
| Impact (MBH) at 60° C. | — |
| % Ta | 87.7 |
| % Haze | 1.5 |
| Initial YIC | 0.8 |
| Heat stability* | 5.2 |
| Optical quality | fair |

*YIC after 500 hours at 100° C.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A laminated glazing unit, comprising sequentially:

a) a glass sheet;

b) a layer of an adhesion promoter comprised of an organofunctional silane;

c) a plasticized polyvinyl chloride containing film which has been subjected to a corona discharge treatment of at least about 20 watts/m$^2$/minute;

d) a layer of an adhesion promoter comprised of an organofunctional silane; and e) a glass sheet.

2. A laminated glazing unit, comprising sequentially:

a) a glass sheet;

b) a first layer of a plasticized polyvinyl chloride containing film;

c) a second layer of a plasticized polyvinyl chloride containing film, the level of plasticization of said first layer being greater than the level of plasticization of said second layer; and d) a glass sheet.

3. A laminated glazing unit as defined in claim 2, further comprising a third layer of a plasticized polyvinyl chloride containing film between said second layer (c) and said glass sheet (d), the level of plasticization of said third layer being greater than the level of plasticization of said second layer.

4. A laminated glazing unit as defined in claim 3, wherein said first and third layers include about 50 to 85 phr of a plasticizer and said second layer includes about 10 to 50 phr of a plasticizer.

* * * * *